(12) United States Patent
Maruyama et al.

(10) Patent No.: US 7,995,288 B2
(45) Date of Patent: Aug. 9, 2011

(54) ZOOM DIAL MECHANISM

(75) Inventors: Kenichi Maruyama, Aichi (JP); Yusuke Doi, Aichi (JP); Hiroshi Yamakose, Aichi (JP)

(73) Assignee: Elmo Co., Ltd., Aichi (JP)

( * ) Notice: Subject to any disclaimer, the term of this patent is extended or adjusted under 35 U.S.C. 154(b) by 21 days.

(21) Appl. No.: 12/656,031

(22) Filed: Jan. 14, 2010

(65) Prior Publication Data
US 2010/0188756 A1    Jul. 29, 2010

(30) Foreign Application Priority Data

Jan. 28, 2009    (JP) ................................. 2009-016136

(51) Int. Cl.
*G02B 15/14*    (2006.01)
(52) U.S. Cl. ....................................................... 359/694
(58) Field of Classification Search .................. 359/694, 359/822–828; 396/5, 428, 263, 419; 248/123.2, 248/207.99
See application file for complete search history.

(56) References Cited

U.S. PATENT DOCUMENTS

| | | | |
|---|---|---|---|
| 4,903,059 A * | 2/1990 | Onda et al. ..................... | 396/413 |
| 7,708,238 B2 * | 5/2010 | Sukenari et al. ............ | 248/123.2 |
| 2004/0179833 A1 | 9/2004 | Nishiwaki | |
| 2007/0165135 A1 | 7/2007 | Sukenari et al. | |

OTHER PUBLICATIONS

Search Report dated May 6, 2010 issued in the corresponding Great Britain patent application No. 1000510.6.

\* cited by examiner

*Primary Examiner* — William C Choi
*Assistant Examiner* — Tuyen Tra
(74) *Attorney, Agent, or Firm* — Posz Law Group, PLC

(57) ABSTRACT

A zoom dial mechanism includes a zoom dial mounted on a base plate so as to extend through a central hole of the base plate and so as to be turnable, a coil spring mounted on the base plate to urge the zoom dial toward a neutral position, and a push knob mounted in a central hole of the dial. The base plate has a groove concentric with the central hole. The coil spring is mounted in the groove. The mechanism further includes a first rib fixed to the dial so as to abut one end of the coil spring and a second rib fixed to the dial so as to abut the other end of the spring. The spring is compressed by the first rib when the dial is turned clockwise, and the coil spring is compressed by the second rib when the dial is turned counterclockwise.

2 Claims, 10 Drawing Sheets

ZOOM DIAL MECHANISM

CROSS-REFERENCE TO RELATED APPLICATIONS

This application is based upon and claims the benefit of priority from the prior Japanese Patent Application No. 2009-16136, filed on Jan. 28, 2009, the entire contents of which are incorporated herein by reference.

BACKGROUND

1. Technical Field

The present invention relates to a zoom dial mechanism which sets a zooming operation of power zoom lens, and more particularly to a zoom dial mechanism suitable for use with a visual presenter provided with a power zoom lens.

2. Description of the Related Art

A visual presenter comprises a base, a pillar standing on the base and a camera head provided on a distal end of the pillar. Material such as document, model or the like is imaged by the camera head. Images thus obtained by the camera head are reproduced by a monitor television or projected on a screen by a video projector.

Japanese patent application publication, JP-A-2007-194884, discloses one type of visual presenter as described above. More specifically, the visual presenter 100 comprises a base 101, a pillar 102 standing on the base 101, and a camera head 103 mounted on a distal end of the pillar 102, as shown in FIG. 8. The pillar 102 of the visual presenter 100 includes an upright portion 102a upstanding on the base 101 and a horizontal portion 102b extending horizontally forward continuously from the upright portion 102a. The horizontal portion 102b has a distal end on which a cylindrical camera head 103 is mounted. A power zoom lens 104 is incorporated on the underside of a distal end of the camera head 103. Furthermore, a zoom dial mechanism 200 is incorporated in a proximal end of the camera head 103. In the camera head 103 are built a zoom mechanism of the power zoom lens 104, an automatic focusing mechanism and a control circuit for these mechanisms.

In the visual presenter as shown in FIG. 8, material is placed on an installation surface so as to be located near a front of the base 101. The zoom dial 201 is manually turned so that a field angle of the power zoom lens 104 is adjusted, and a central push knob 202 of the zoom dial 201 is pushed so that the automatic focusing mechanism is activated, whereupon the material is imaged by the camera head 103.

The aforesaid zoom dial mechanism 200 comprises a base plate 203, a zoom dial 201 and an automatic focusing push knob 202 as shown in FIG. 9. The zoom dial 201 is provided in a central hole 203a (see FIG. 10) of the base plate 203 so as to be turnable clockwise and counterclockwise. The zoom dial 201 sets a zooming operation of the power zoom lens 104 according to the direction of turn and an amount of turn thereof. The automatic focusing push knob 202 is mounted in a central hole 201a of the zoom dial 201 so as to be movable forward and rearward relative to the central hole 201a.

In the above-described zoom dial mechanism, the base plate 203 has three protrusions 203b, 203c and 203d formed around the central hole 203a thereof as shown in FIG. 10. A torsion spring 204 is mounted on the protrusions 203b, 203c and 203d to urge the zoom dial 201 toward a rotational neutral position. The torsion spring 204 is disposed so as to encompass the central hole 203a of the base plate 203. The torsion spring 204 has one end 204a which locks a first rib 201b provided on the zoom dial 201 and the other end 204b which locks a second rib 201c of the zoom dial 201. When the zoom dial 201 is turned clockwise, the one end 204a of the torsion spring 204 expands clockwise by the first rib 201b. When the user detaches his or her fingers from the zoom dial 201 to stop dial operation, the end 204a of the expanded torsion spring 204 contracts such that the zoom dial 201 returns to the neutral position. When the zoom dial 201 is turned counterclockwise, the other end 204c of the torsion spring 201 expands counterclockwise by the second rib 201c. When the user stops dial operation, the zoom dial 201 returns to the neutral position.

The torsion spring 204 has a larger diameter than the central hole 203a of the base plate 203 in the above-described conventional zoom dial mechanism 200. The torsion spring 204 is mounted on the base plate 203 so as to surround the central hole 203a. Accordingly, the torsion spring 204 necessitates a sufficient space around the central hole 203a to be mounted on the base plate 203. This increases the size of the base plate 203, rendering size reduction of the dial mechanism 200 difficult.

Furthermore, the pin-like ends 204a and 204b of the torsion spring 204 and the ribs 201b and 201c easily disengage from each other respectively. This not only causes failure in the zoom dial mechanism 200 but also necessitates careful assembly of the base plate 203 and the zoom dial 201, the latter of which reduces the assembling efficiency.

SUMMARY

Therefore, an object of the present invention is to provide a zoom dial mechanism which is smaller in size and can be assembled with higher efficiency.

The present invention provides a zoom dial mechanism comprising a base plate having a central through hole; a zoom dial which is mounted on the base plate so as to extend through the central hole of the base plate and so as to be turnable clockwise and counterclockwise, the zoom dial setting a zooming operation of a power zoom lens according to a turning direction and an amount of turn thereof, the zoom dial having a central hole; a coil spring which is mounted on the base plate to urge the zoom dial toward a neutral position thereof; and a push knob which is mounted in the central hole of the zoom dial so as to be movable forward and rearward, wherein the base plate has an arc-shaped groove which is formed outside the central hole thereof and is substantially concentric with the central hole thereof, and the coil spring is mounted in the arc-shaped groove and having two ends, the mechanism further comprising a first rib which is fixed to the zoom dial so as to abut the one end of the coil spring and a second rib which is fixed to the zoom dial so as to abut the other end of the coil spring, wherein the coil spring is compressed by the first rib when the zoom dial is turned clockwise, and the coil spring is compressed by the second rib when the zoom dial is turned counterclockwise.

According to the above-described construction, the coil spring is compressed by the first rib when the zoom dial is turned clockwise, and the coil spring is compressed by the second rib when the zoom dial is turned counterclockwise. When the user detaches his or her fingers from the zoom dial to stop the zoom operation, the compressed coil spring expands to return the zoom dial to the neutral position. Since the coil spring is disposed in the arc-shaped groove concentric with the central hole, an installation space can be rendered smaller than of the conventional zoom dial mechanism. Consequently, the size of the zoom dial mechanism can be reduced.

Furthermore, the assembly efficiency of the zoom dial mechanism can be improved since the coil spring is mounted by being loaded only in the arc-shaped groove.

In an embodiment, the base plate has a stopper protrusion which is formed thereon so as to be located opposite the arc-shaped groove, and the zoom dial has a first stopper which abuts the stopper protrusion to limit an amount of clockwise turn of the zoom dial and a second stopper which abuts the stopper protrusion to limit an amount of counterclockwise turn of the zoom dial. Since an amount of turn of the zoom dial is limited by the first or second stopper piece, a restoring force of the coil spring can be prevented from being excessively large, whereupon an operational feeling can be prevented from deteriorating.

DETAILED DESCRIPTION OF THE EMBODIMENT

Figure 1:
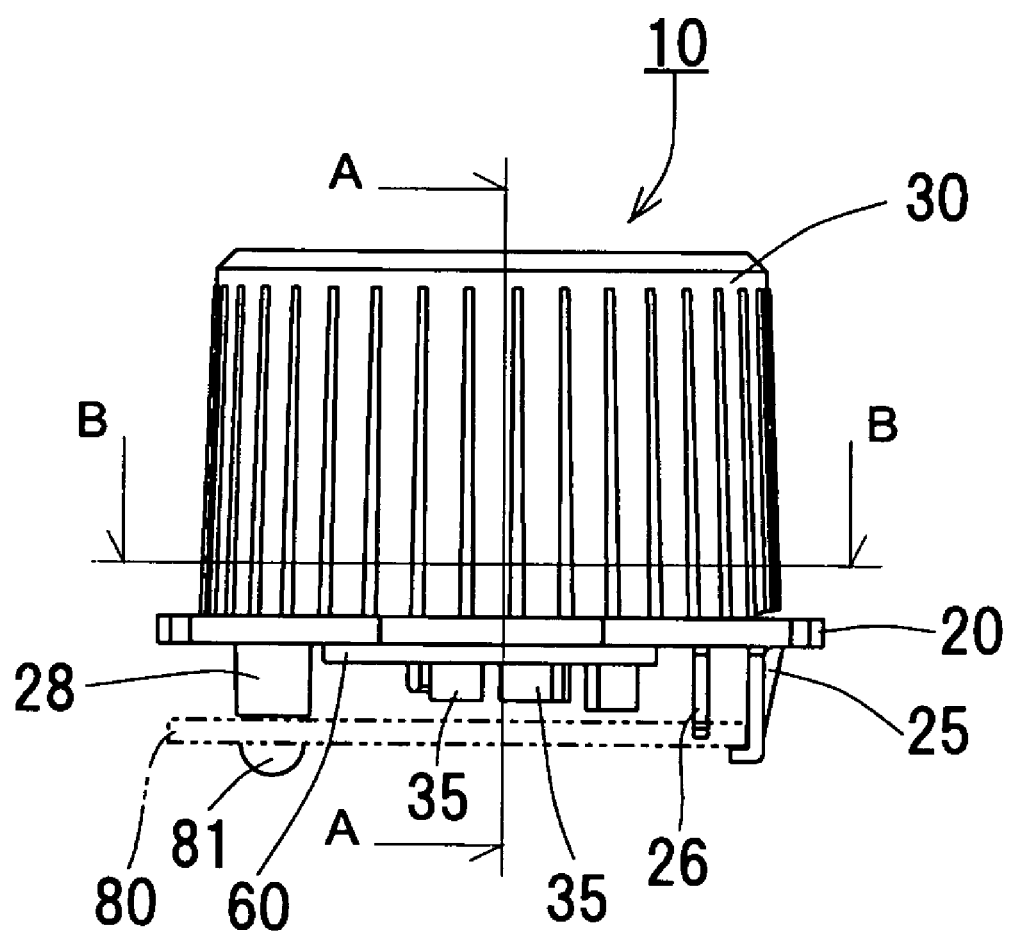
FIG. 1 is a side view of a zoom dial mechanism of one embodiment in accordance with the present invention.
Figure 2:
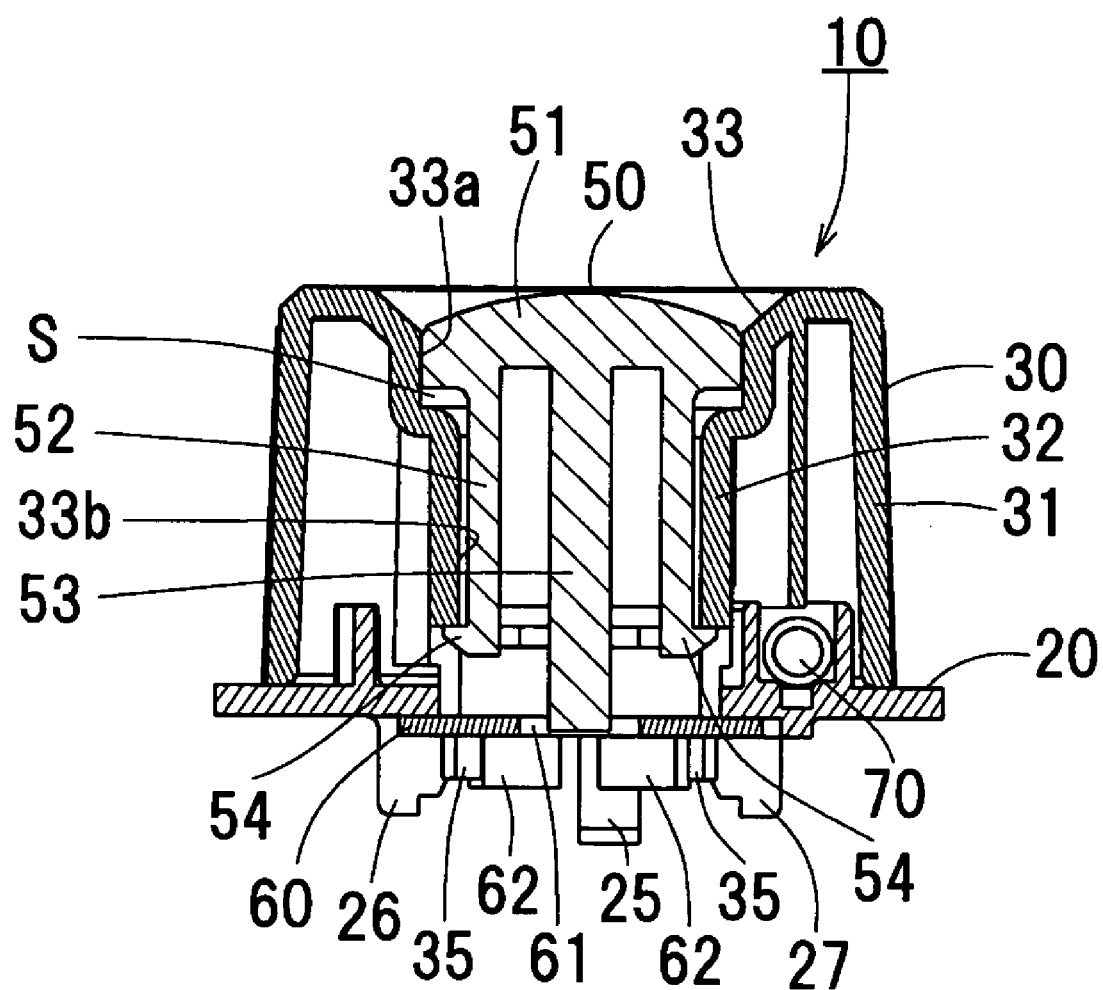
FIG. 2 is a sectional view taken along line A-A in FIG. 1.
Figure 3:
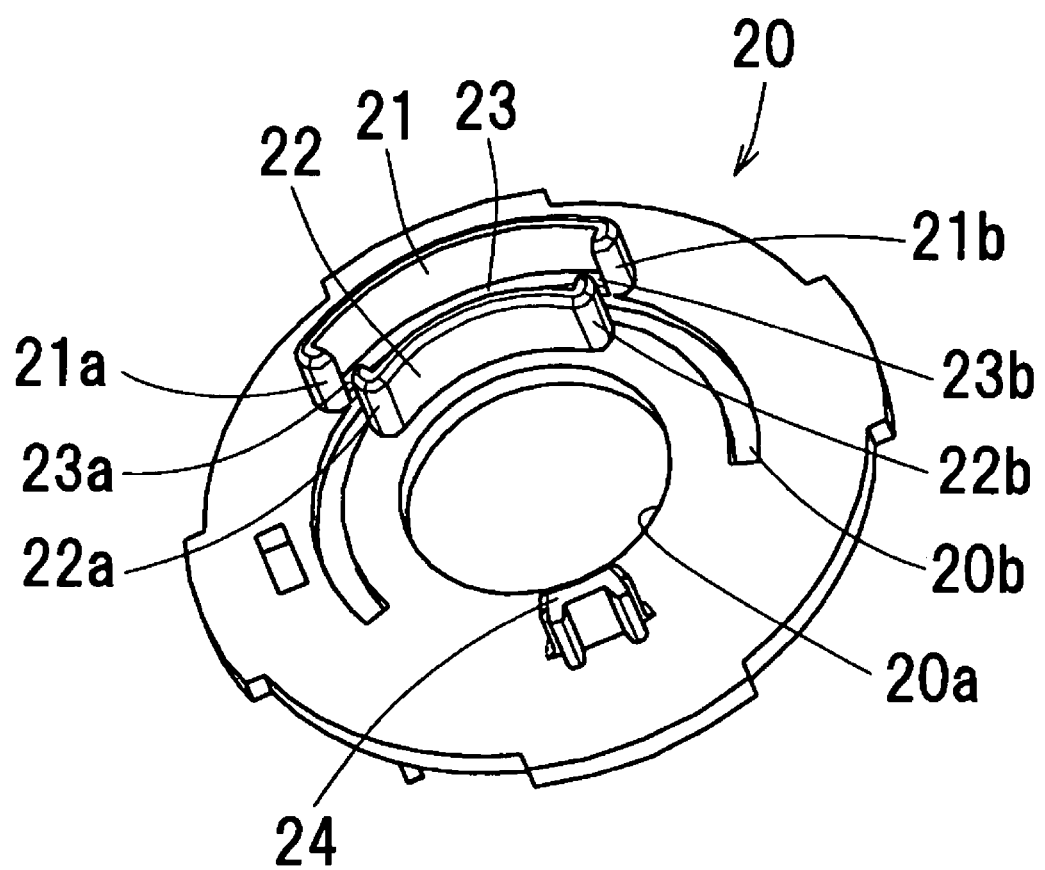
FIG. 3 is a perspective view of a base plate of the zoom dial mechanism.

One embodiment in accordance with the present invention will be described with reference to FIGS. 1 to 7. Referring to FIGS. 1 and 2, the zoom dial mechanism 10 of the embodiment is shown. The zoom dial mechanism 10 includes a base plate 20, a zoom dial 30, a push knob 50 and a circular plate 60.

The base plate 20 is formed into a generally circular shape and has a centrally located through hole 20a and an arc-shaped guide slit 20b which is concentric with the central hole 20a. The base plate 20 further has two inner and outer arc-shaped pieces 21 and 22 protruding from an inner side of the base plate 20 so that the arc-shaped pieces 21 and 22 are concentric with the central hole 20a. An arc-shaped groove 23 concentric with the central hole 20a is defined by the arc-shaped pieces 21 and 22 therebetween. The arc-shaped piece 21 has two ends formed with first and second engagement portions 21a and 21b both of which are bent inside the groove 23 respectively. The arc-shaped piece 22 also has two ends formed with first and second engagement portions 22a and 22b respectively. The engagement portion 21a of the arc-shaped piece 21 and the engagement portion 22a are located opposite each other, and the engagement portion 21b of the arc-shaped piece 21 and the engagement portion 22b of the arc-shaped piece 22 are located opposite each other. A first passage 23a is defined between the opposed engagement portions 21a and 22a, and a second passage 23b is defined between the opposed engagement portions 21b and 22b. The guide slit 20b passes through the bottom of the arc-shaped groove 23, extending outward from both ends of the arc-shaped groove 23. The base plate 20 has a stopper piece 24 protruding from a side thereof located opposite the arc-shaped groove 23 relative to the central hole 20a. Three engagement pieces 25, 26 and 27 and a boss 28 are formed on an outer side of the base plate 20 as shown in FIGS. 1 and 2.

Figure 4:
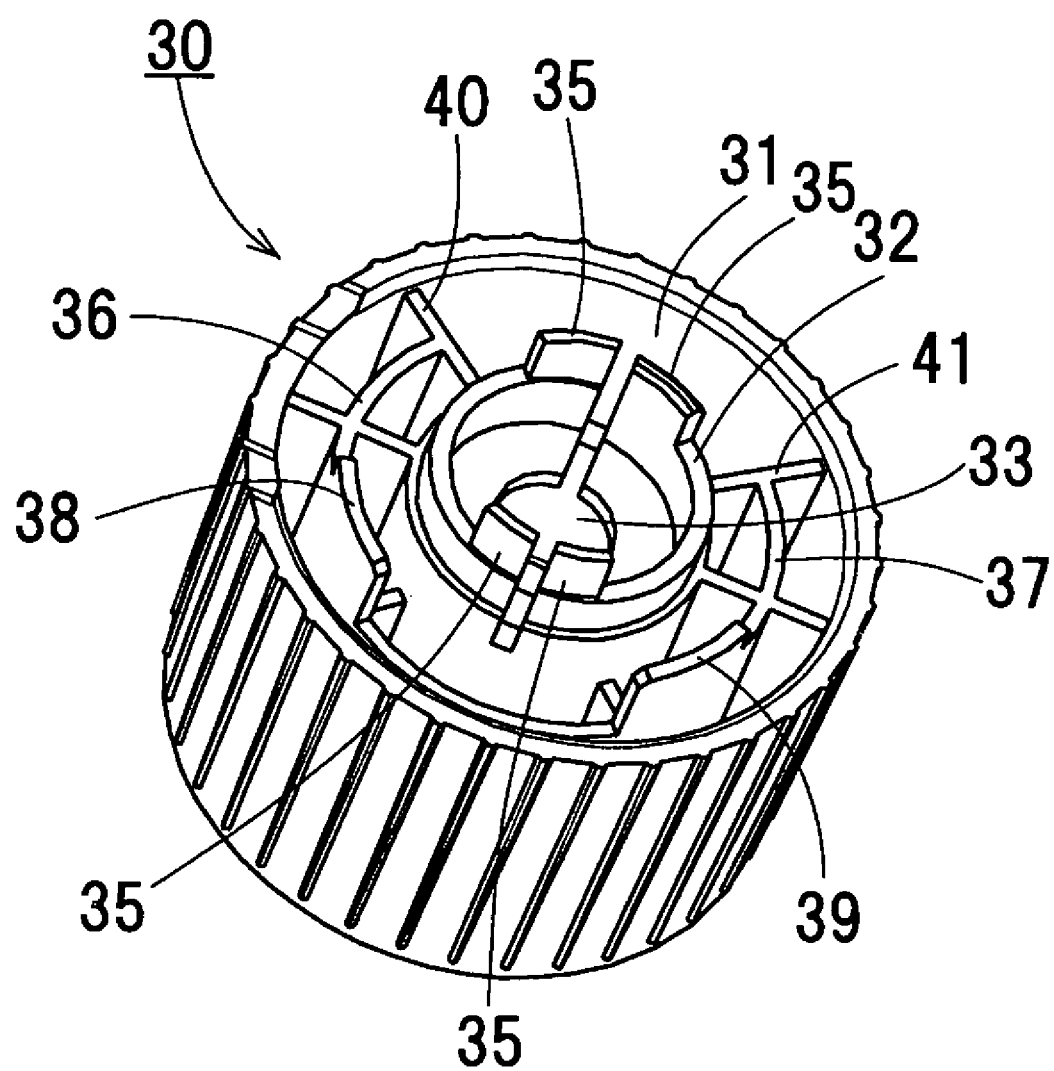
FIG. 4 is a perspective view of a zoom dial of the zoom dial mechanism.

The zoom dial 30 includes an outer cylinder 31 and an inner cylinder 32 centrally located in the outer cylinder 31 and thus has a double cylindrical structure, as shown in FIGS. 2 and 4. A central hole 33 is defined by the inner cylinder 32. The zoom dial 30 has a larger diameter portion 33a formed on an outer end side of the central hole 32 and a smaller diameter portion 33b which is formed on an inner end side of the central hole 32 so as to be continuous from the larger diameter portion 33a. Four engagement pieces 35 protrude from the inner end of the smaller diameter portion 33b, extending in the direction of a centerline of the central hole 33. First and second arc-shaped ribs 36 and 37 are formed between the outer and inner cylinders 31 and 32 so as to be concentric with the central hole 33. The ribs 36 and 37 have one ends formed with first and second pressing pieces 38 and 39 protruding inward in the direction of the center line of the center hole 33 respectively. The pressing pieces 38 and 39 are oppositely spaced from each other. The ribs 36 and 37 include first and second stopper pieces 40 and 41 which are formed on sides opposite the pressing pieces 38 and 39 and extend radially, respectively. The stopper pieces 40 and 41 are oppositely spaced from each other.

The push knob includes a head 51, a cylinder shaft 52 continuous from the head 51 and a push rod 53 extending from the head 51 and passing through the center of the cylinder shaft 52 as shown in FIG. 2. The head 51, the cylinder shaft 52 and the push rod 53 are formed integrally with one another. Two engagement claws 54 are formed on inner end of the cylinder shaft 52 so as to be concentric with each other with respect to the center line of the cylinder shaft 52.

Figure 5:
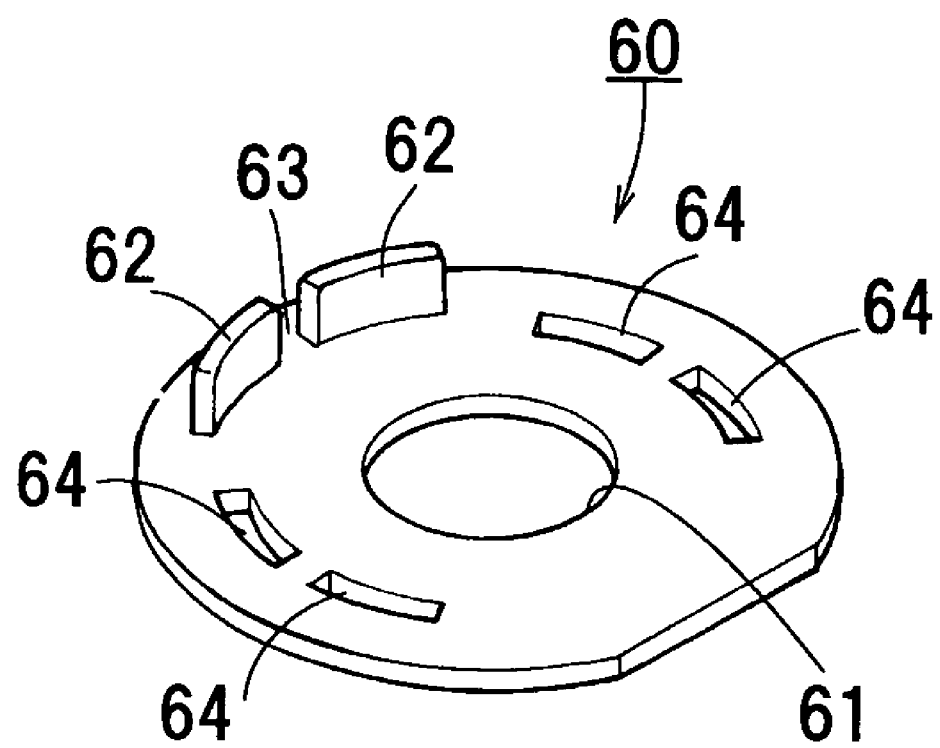
FIG. 5 is a perspective view of a circular plate of the zoom dial mechanism.

The circular plate 60 has a central through hole 61 formed in a central part thereof and two arc-shaped engagement pieces 62 which protrude therefrom and are concentric with the central hole 61. The engagement pieces 62 are located close to each other and have respective ends which are located opposite each other and defining a space 63 therebetween, as shown in FIG. 5. Furthermore, the circular plate 60 has four arc-shaped engagement slits 64 formed therein so as to be concentric with the central hole 61.

Figure 6:
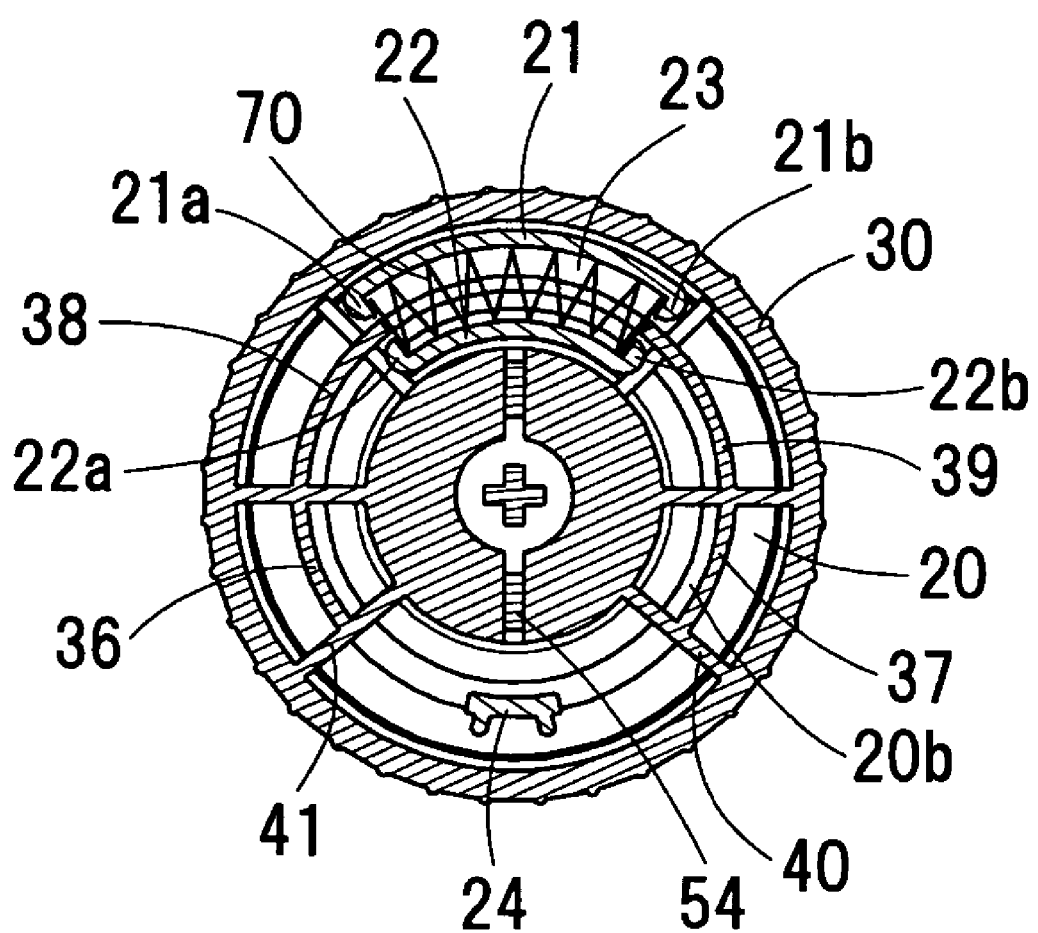
FIG. 6 is a sectional view taken along line B-B in FIG. 1.

The above-described base plate 20, the zoom dial 30, the push knob 50 and the circular plate 60 constituting the zoom dial mechanism 10 will be assembled in the following manner. The coil spring 70 is placed in the arc-shaped groove 23 of the base plate 20 as shown in FIG. 6. One end of the coil spring 70 is pressed against and thereby engaged with the engagement portions 21a and 22a. The other end of the coil spring 70 is also pressed against and thereby engaged with the engagement portions 21b and 22b. Thus, the coil spring 70 is provided in the arc-shaped groove so as not to fall off.

The cylinder shaft 52 of the push knob 52 is inserted through the central hole 33 of the zoom dial 30, and the engagement claws 54 of the push knob 52 are engaged with the inner end of the inner cylinder 32 of the zoom dial 30. The push knob 50 is thus mounted in the zoom dial 30. The push knob 50 thus mounted is movable forward and rearward relative to the central hole 33 with a stroke corresponding to a predetermined gap S (see FIG. 2) defined between the head 51 and the smaller diameter portion 33b of the central hole 33 of the zoom dial 30.

The zoom dial 30 in which the push knob 50 has been mounted is set onto the base plate 20 loaded with the coil spring 70 so that the zoom dial 30 and the base plate 20 are assembled together. In this case, the inner cylinder 32 of the zoom dial 30 is fitted in the central hole 20a of the base plate 20 so as to be turnable, and the engagement pieces 35 of the inner end of the inner cylinder 32 are protruded outward from the central hole 20a of the base plate 39. Furthermore, the first pressing piece 38 of the zoom dial 30 is caused to face the first passage 23a, and the second pressing piece 39 of the zoom dial 30 is caused to face the second passage 23b. Additionally, the first and second pressing pieces 38 and 39 are slidably fitted in the guide slits 20b of the guide plate 20 respectively.

After the zoom dial 30 has been set on the base plate 20, the circular plate 60 is set onto the base plate 20 so that the four engagement pieces 35 protruding from the central hole 20a of the base plate 20 are inserted into the slits 64 of the circular plate 60 respectively. The engagement pieces 35 protruding outward from the engagement slits 64 are heated thereby to be collapsed, whereby the zoom dial 30 is assembled onto the base plate 20.

An electrical circuit board 80 (see FIG. 1) is then mounted on the zoom dial mechanism 10 thus assembled. One end of the circuit board 80 is engaged with the three engagement pieces 25 to 27 formed on the outer side of the base plate 20, and the other end of the circuit board 80 is fastened to the boss 28 by a screw 81, whereupon the circuit board 80 is fixed to the base plate 20. On the circuit board 80 are provided an autofocus switch (not shown) on-off controlling the autofocus control mechanism of the power zoom lens 104 and a zoom switch (not shown) setting a zooming operation of the zoom mechanism. The autofocus switch is operated when the push knob 50 is pressed so that the push rod 53 is pressed. Furthermore, the zoom switch is provided with a lever piece (not shown) and mounted on the circuit board 80 so that the lever piece is engaged into the space 63 between the ends of the engagement pieces 62 of the circular plate 60. When the zoom dial 30 is turned, the circular plate 60 is also turned with the zoom dial 30, whereby the lever piece of the zoom switch is turned.

The zoom dial mechanism 10 with the above-described structure will work as follows. The push knob 50 is depressed to turn on the autofocus switch, whereby the autofocus mechanism is activated. The zoom dial 30 is turned in order that a field angle of the power zoom lens 104 may be adjusted. The coil spring 70 is compressed by the pressing piece 38 of the first rib 36 when the zoom dial 30 is turned clockwise. The coil spring 70 is compressed by the pressing piece 39 of the second rib 37 when the zoom dial 30 is turned counterclockwise as shown by arrow in FIG. 7. The circular plate 60 is turned on in association with the turning of the zoom dial 30, whereby the zoom switch is turned on such that the power zoom lens is activated. When the zoom dial 30 is turned clockwise, the zoom lens is driven to a wide-angle side. When the zoom dial 30 is turned counterclockwise, the zoom lens is driven to a telephoto side. A zooming speed in the drive to the wide-angle or telephoto side is changed according to an amount of turn. The zooming speed is rendered higher as an amount of turn is increased.

When the user detaches his or her fingers from the zoom dial 30 to stop the zooming operation, the compressed coil spring 70 expands such that the zoom dial 30 returns to the neutral position as shown in FIG. 1. When the zoom dial returns to the neutral position, the zoom switch is turned off such that the zoom mechanism is de-activated.

Figure 7:
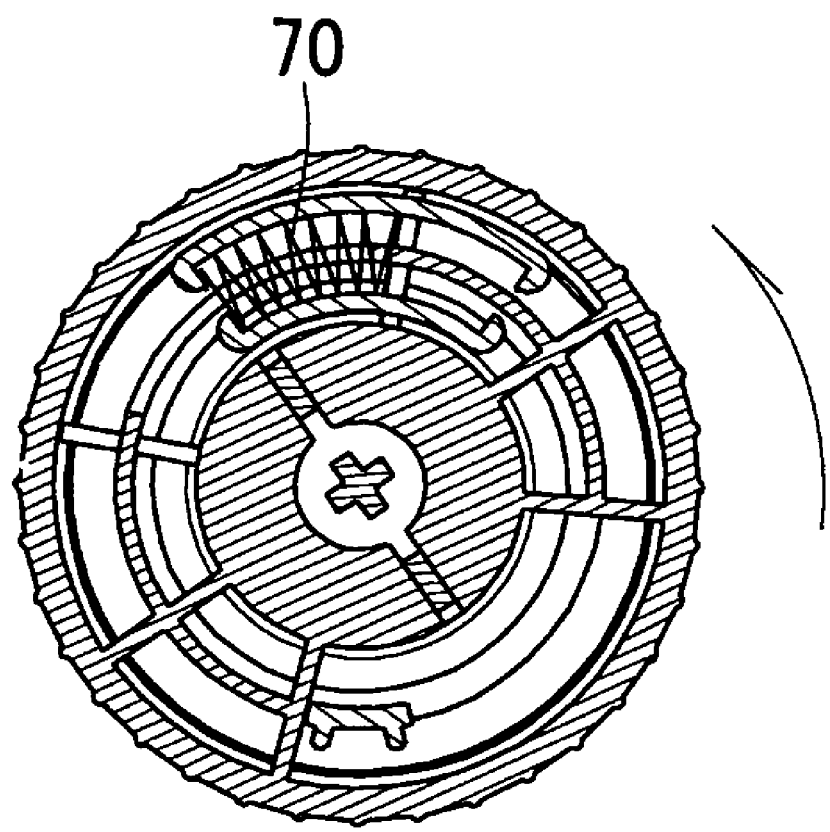
FIG. 7 is a sectional view taken along line B-B in FIG. 1, showing the zoom dial having been turned counterclockwise.
Figure 8:
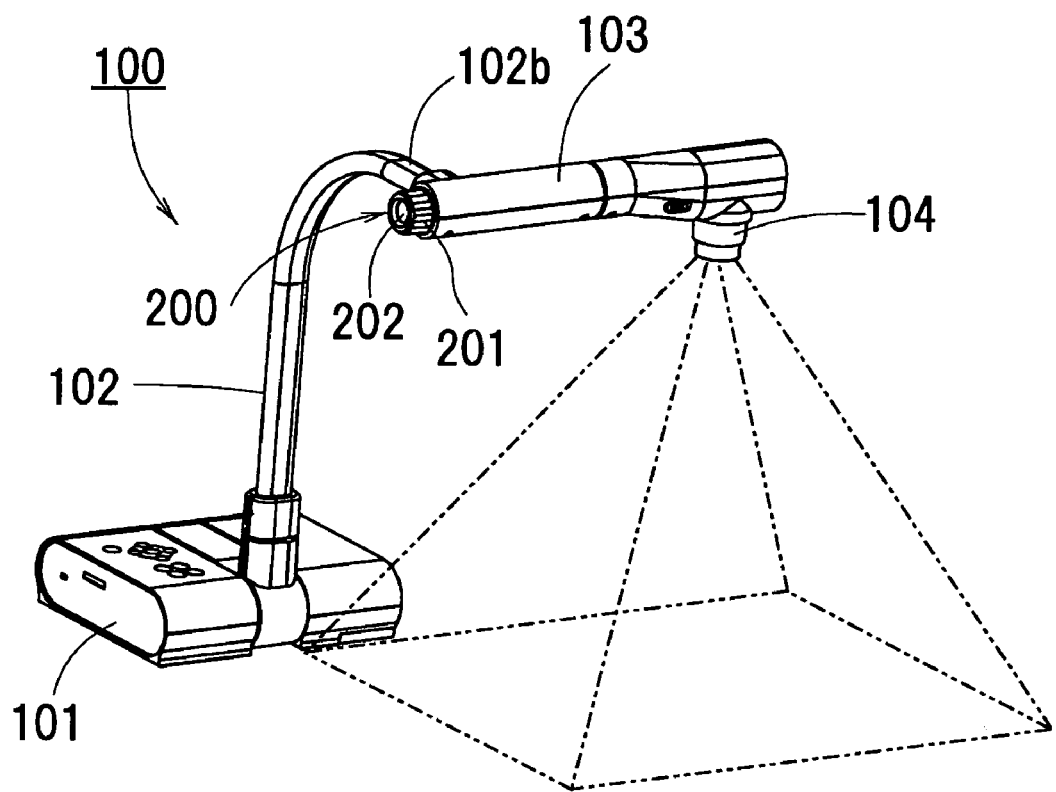
FIG. 8 is a perspective view of a visual presenter provided with a conventional zoom dial mechanism.
Figure 9:
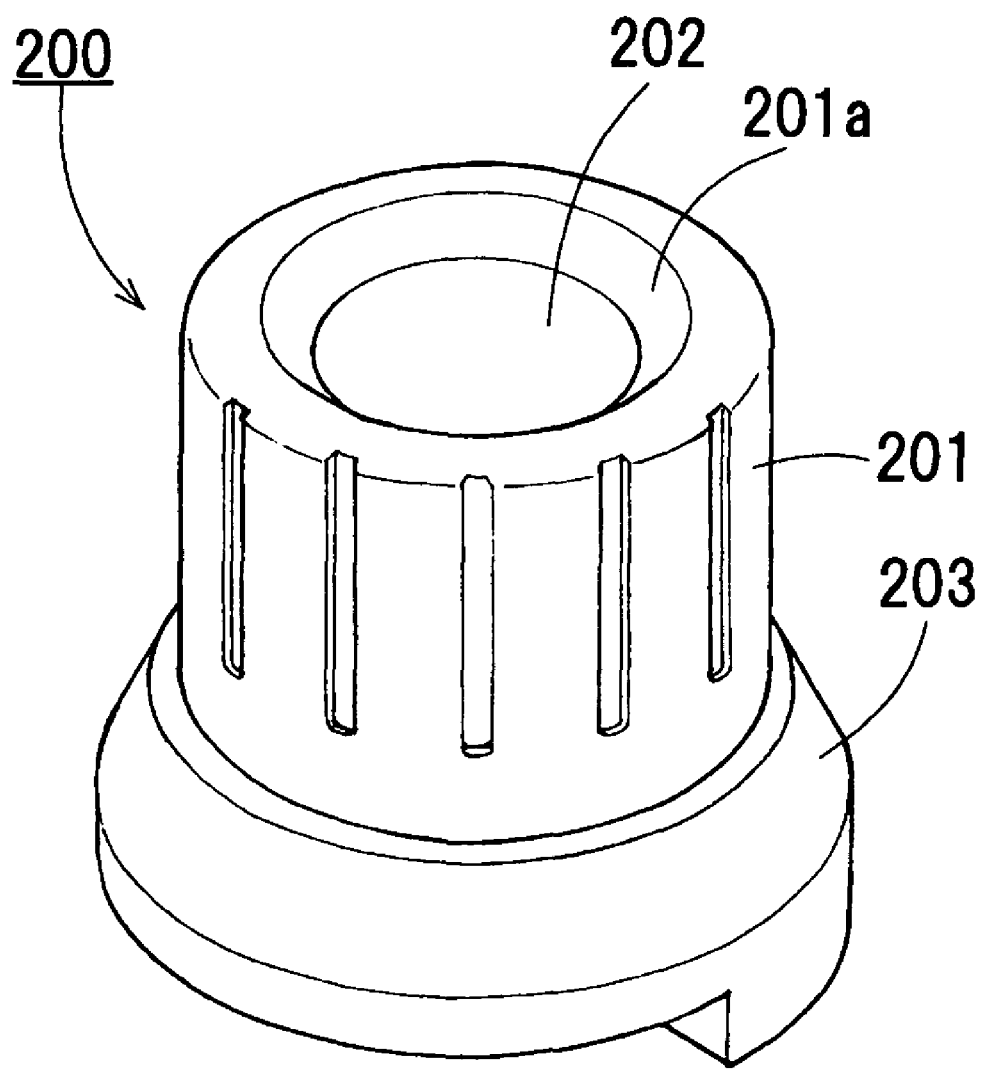
FIG. 9 is a perspective view of the conventional zoom dial mechanism.
Figure 10:
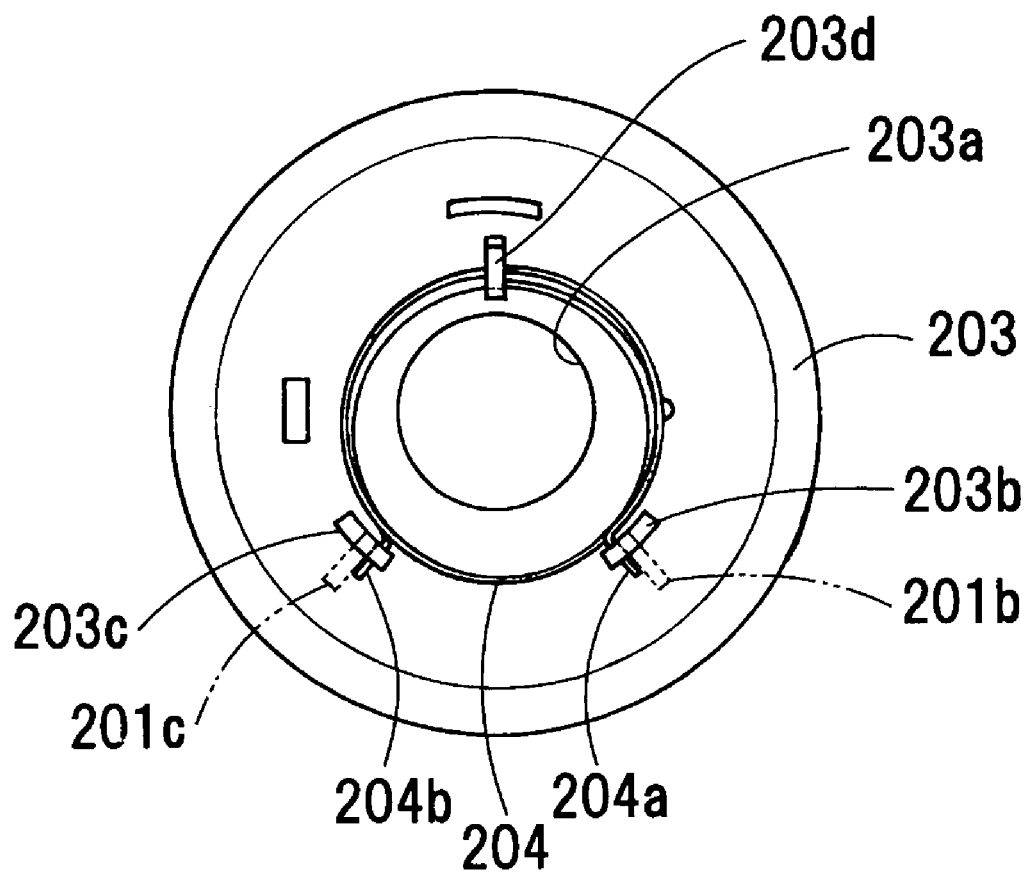
FIG. 10 is a plan view of a base plate of the conventional zoom dial mechanism.

The clockwise turn of the zoom dial 30 is limited when the first stopper 40 abuts the stopper protrusion 24 of the base plate 20, whereupon further clockwise turn is disallowed. In the same way, the counter clockwise turn of the zoom dial 30 is also limited when the second stopper 41 abuts the stopper protrusion 24, whereupon further counterclockwise turn is disallowed, as shown in FIG. 7.

According to the above-described zoom dial mechanism 10, the coil spring 70 is mounted in the arc-shaped groove 23 concentric with the central hole 20a. Accordingly, the mounting space of the coil spring 70 is reduced as compared with the conventional zoom dial mechanism using the torsion spring. Consequently, the size of the zoom dial mechanism 10 can be reduced.

Furthermore, the efficiency of the assembling work can be improved since the coil spring 70 can be mounted by being loaded only in the arc-shaped groove 23. Furthermore, the zoom dial 30, the coil spring 70, the push knob 50, the base plate 20 and the circular plate 60 are assembled together only by collapsing the engagement pieces 35. Thus, since no fastening means such as screws are necessary, the assembling efficiency can be improved and the manufacturing costs can be reduced. Additionally, since an amount of turn of the zoom dial 30 is limited by the first or second stopper piece 40 or 41, a restoring force of the coil spring can be prevented from being excessively large, whereupon an operational feeling can be prevented from deteriorating.

The foregoing description and drawings are merely illustrative of the principles of the present invention and are not to be construed in a limiting sense. Various changes and modifications will become apparent to those of ordinary skill in the art. All such changes and modifications are seen to fall within the scope of the invention as defined by the appended claims.

What is claimed is:

1. A zoom dial mechanism comprising:
a base plate having a central through hole;
a zoom dial which is mounted on the base plate so as to extend through the central hole of the base plate and so as to be turnable clockwise and counterclockwise, the zoom dial setting a zooming operation of a power zoom lens according to a turning direction and an amount of turn thereof, the zoom dial having a central hole;
a coil spring which is mounted on the base plate to urge the zoom dial toward a neutral position thereof;
and a push knob which is mounted in the central hole of the zoom dial so as to be movable forward and rearward,
wherein the base plate has an arc-shaped groove which is formed outside the central hole thereof and is substantially concentric with the central hole thereof, and the coil spring is mounted in the arc-shaped groove and having two ends,
the mechanism further comprising a first rib which is fixed to the zoom dial so as to abut the one end of the coil spring and a second rib which is fixed to the zoom dial so as to abut the other end of the coil spring,
wherein the coil spring is compressed by the first rib when the zoom dial is turned clockwise, and the coil spring is compressed by the second rib when the zoom dial is turned counterclockwise.

2. The zoom dial mechanism according to claim 1, wherein the base plate has a stopper protrusion which is formed thereon so as to be located opposite the arc-shaped groove, and the zoom dial has a first stopper which abuts the stopper protrusion to limit an amount of clockwise turn of the zoom dial and a second stopper which abuts the stopper protrusion to limit an amount of counterclockwise turn of the zoom dial.

* * * * *